(12) United States Patent
Lim

(10) Patent No.: US 12,146,518 B2
(45) Date of Patent: Nov. 19, 2024

(54) L-SHAPED BOLT FASTENING STRUCTURE FOR UPRIGHT FASTENING

(71) Applicant: GNI. Co., Ltd., Hwaseong-si (KR)

(72) Inventor: Chang Su Lim, Hwaseong-si (KR)

(73) Assignee: GNI. CO., LTD. (KR)

( * ) Notice: Subject to any disclaimer, the term of this patent is extended or adjusted under 35 U.S.C. 154(b) by 128 days.

(21) Appl. No.: 18/125,704

(22) Filed: Mar. 23, 2023

(65) Prior Publication Data
US 2024/0133416 A1 Apr. 25, 2024
US 2024/0229854 A9 Jul. 11, 2024

(30) Foreign Application Priority Data

Oct. 19, 2022 (KR) .......................... 10-2022-0134879
Feb. 8, 2023 (KR) .......................... 10-2023-0016575

(51) Int. Cl.
F16B 35/04 (2006.01)
F16B 39/10 (2006.01)

(52) U.S. Cl.
CPC .......... *F16B 35/041* (2013.01); *F16B 39/108* (2013.01)

(58) Field of Classification Search
CPC ..... F16B 35/041; F16B 35/044; F16B 39/108
USPC ........................................................ 411/424
See application file for complete search history.

(56) References Cited

U.S. PATENT DOCUMENTS

| | | | | |
|---|---|---|---|---|
| 4,095,376 A * | 6/1978 | Lotane | ..................... | B24B 41/06 451/367 |
| 4,254,974 A * | 3/1981 | Rolke | ..................... | C10B 25/12 292/259 R |
| 5,094,622 A * | 3/1992 | Auclair | ..................... | H01R 4/64 439/94 |
| 5,620,290 A * | 4/1997 | Homfeldt | .............. | F16B 39/108 411/533 |
| 5,678,772 A * | 10/1997 | Bettenhausen | ...... | A01G 25/092 403/291 |
| 6,547,573 B1 * | 4/2003 | Allen | ........................ | H01R 4/64 439/92 |
| 6,874,288 B1 * | 4/2005 | Washa | ................... | E04G 13/062 52/155 |
| 2002/0066620 A1 * | 6/2002 | Lindsey | ..................... | E06C 9/04 182/92 |
| 2007/0177956 A1 * | 8/2007 | Laflamme | ............. | B60P 7/0892 410/108 |

(Continued)

FOREIGN PATENT DOCUMENTS

KR 100730721 B1 6/2007

*Primary Examiner* — Gary W Estremsky

(74) *Attorney, Agent, or Firm* — Renaissance IP Law Group LLP

(57) ABSTRACT

Disclosed is an L-shaped bolt fastening structure for upright fastening which is capable of quickly and firmly fixing equipment to a support structure such as a grating plate without changing the installed grating plate. Since a bent portion of an L-shaped bolt includes a locking groove and an upright auxiliary portion, in a state in which the L-shaped bolt is upright, a fixing nut can be fastened. Accordingly, the fixing nut can be easily and quickly coupled, and also a correct coupling posture can be implemented even after the fixing nut is completely tightened. In addition, since a coupling long hole washer that is divided and coupled is added between a bracket and a fixing nut, when the fixing nut is fastened to the L-shaped bolt, the fixing nut can be fastened in a state in which the L-shaped bolt is upright.

13 Claims, 19 Drawing Sheets

(56) References Cited

U.S. PATENT DOCUMENTS

| | | | |
|---|---|---|---|
| 2015/0060096 A1* | 3/2015 | Kovach | A01B 35/28 |
| | | | 172/763 |
| 2018/0180084 A1* | 6/2018 | Chen | F16B 5/02 |
| 2020/0284029 A1* | 9/2020 | Drummond | E04B 1/4121 |
| 2023/0250844 A1* | 8/2023 | Lim | F16B 43/00 |
| | | | 411/337 |

* cited by examiner

500

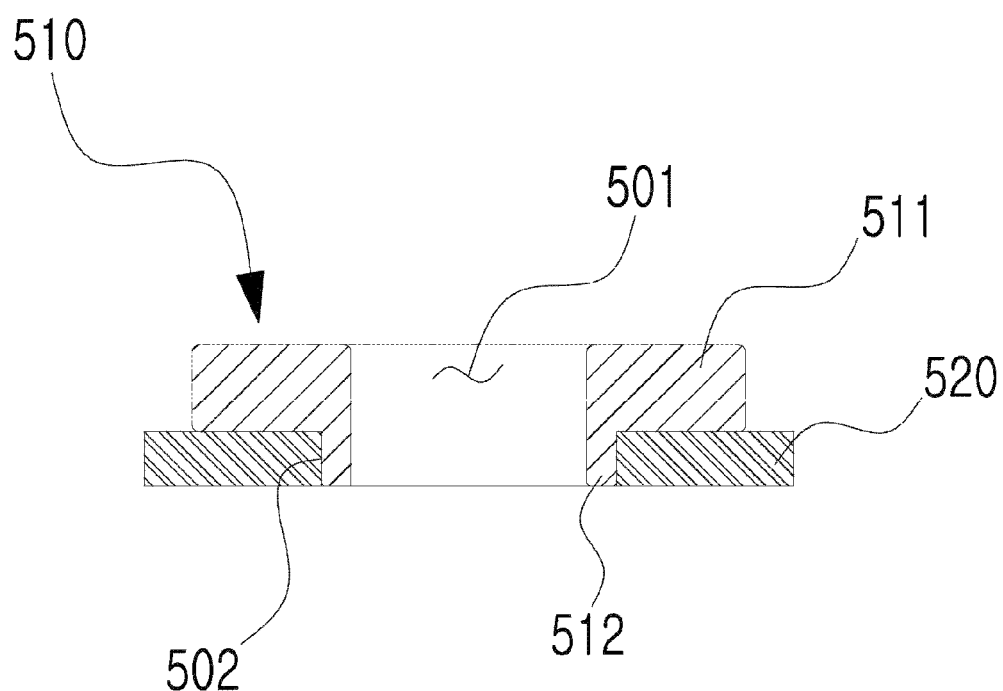

L-SHAPED BOLT FASTENING STRUCTURE FOR UPRIGHT FASTENING

CLAIM FOR PRIORITY

This application claims priority to Korean Patent Application No. 10-2022-0134879 filed on Oct. 19, 2022 and to Korean Patent Application No. 10-2023-0016575 filed on Feb. 8, 2023 in the Korean Intellectual Property Office (KIPO), the entire contents of which are hereby incorporated by reference.

BACKGROUND

1. Technical Field

Example embodiments of the present invention relate to a bolt fastening structure, and more particularly, to an L-shaped bolt fastening structure for upright fastening.

2. Related Art

In general, in production facilities, equipment is fixed to and installed on lower structures such as grating plates. Usually, grating plates are installed at a certain height from a ground surface, and pipes, wires, and the like are installed below the grating plates. In this way, a plurality of grating plates are arranged at a certain height to form such a shelf-like shape, and the height reaches a range of about 4 m to 10 m. Production equipment is fixed to and installed on grating plates installed as described above. Equipment is fixed and installed through a typical method of fastening the corresponding equipment and a grating plate using brackets. However, a task of, on a grating plate that equipment is to be fixed to and placed on, fixing the equipment to the grating plate using brackets without changing a position of the grating plate is difficult. As described above, since a grating plate is installed at a certain height in the form of a shelf, other workers should assist in tightening fasteners such as bolts/nuts under the grating plate every time. Therefore, work under the grating plate is time-consuming and risky for workers.

On the other hand, when a part of a grating plate installed in the form of a shelf is lifted at a production site, serious safety accidents such as a worker falling occur.

In addition, during fastening using fasteners such as bolts/nuts, when a nut is forcibly fastened to a bolt that is tilted instead of upright, a thread of the bolt may be worn, or the bolt may break. In addition, when a thread of a bolt is worn, a nut does not come off the bolt, and thus the bolt should be broken using a separate tool, or a grating plate should be replaced.

SUMMARY

Accordingly, example embodiments of the present invention are provided to substantially obviate one or more problems due to limitations and disadvantages of the related art.

Example embodiments of the present invention provide an L-shaped bolt fastening structure for upright fastening, which is capable of quickly and firmly fixing equipment to a support structure such as a grating plate without changing the installed grating plate.

In some example embodiments, an L-shaped bolt coupling structure includes a lower structure which is positioned below equipment of an industrial facility and in which a hole for fastening is formed, an L-shaped bolt inserted into the hole of the lower structure and including an upper vertical portion on which a thread is formed and a lower horizontal portion which is formed to extend from a lower end of the upper vertical portion through a bent portion, a fall-prevention washer which has a ring shape, is fastened to the L-shaped bolt, and is supported on an upper surface of the lower structure to prevent the L-shaped bolt from falling below the lower structure, a bracket disposed on the lower structure and having a long hole into which the L-shaped bolt is inserted, an anti-loosening washer and a fixing nut disposed on the bracket and sequentially fastened to the L-shaped bolt, and a coupling long hole washer fastened to the L-shaped bolt and disposed between the bracket and the anti-loosening washer.

The coupling long hole washer may include a stacked washer having a fastening hole into which the L-shaped bolt is inserted, and a support washer having a ring shape and an insertion hole in a central portion thereof for the stacked washer to be inserted and stacked.

The stacked washer may include a support portion supported on an upper surface of the support washer and having a certain thickness, and a hole insertion portion formed below the support portion and inserted into the insertion hole of the support washer.

A lower surface of the hole insert portion may be coplanar with a lower surface of the support washer.

An inner diameter of the fastening hole of the stacked washer may be equal to an outer diameter of the L-shaped bolt, and an inner diameter of the insertion hole of the support washer may be equal to an outer diameter of the hole insertion portion.

The L-shaped bolt may include a locking groove having a groove shape and a certain angle on a bent inner portion of the bent portion.

The fall prevention washer may include a locking portion which has a ring shape and is supported on the upper surface of the lower structure, and a coupling hole which is formed inside the locking portion and into which the L-shaped bolt is inserted.

The L-shaped bolt may include an upright auxiliary portion having a shape that protrudes from a bent outer portion of the bent portion.

The fall prevention washer may further include a mounting groove formed on the locking portion such that the locking portion passes through the upright auxiliary portion to be mounted on the upper vertical portion of the L-shaped bolt.

The locking portion may further include a plurality of cut portions formed inside the locking portion.

The fall prevention washer may further include an insertion portion formed below the locking portion and inserted into the hole of the lower structure.

The locking portion may be formed in a zigzag shape, and the fall prevention washer may further include an extension portion which is formed to extend from the locking portion and allows a size of the coupling hole to be enlarged or reduced through elasticity thereof.

The fall prevention washer may include a ring portion having a ring shape and a coupling hole into which the L-shaped bolt is inserted, a protrusion protruding from one side of the ring portion, and an extension portion which formed by being divided from the other side of the ring portion, is widened by an external force, and is narrowed by elasticity thereof.

BRIEF DESCRIPTION OF DRAWINGS

Example embodiments of the present invention will become more apparent by describing in detail example embodiments of the present invention with reference to the accompanying drawings, in which:

FIG. 13 is a cross-sectional view illustrating a coupled state of the coupling long hole washer of the present invention;

DESCRIPTION OF EXAMPLE EMBODIMENTS

Figure 1:
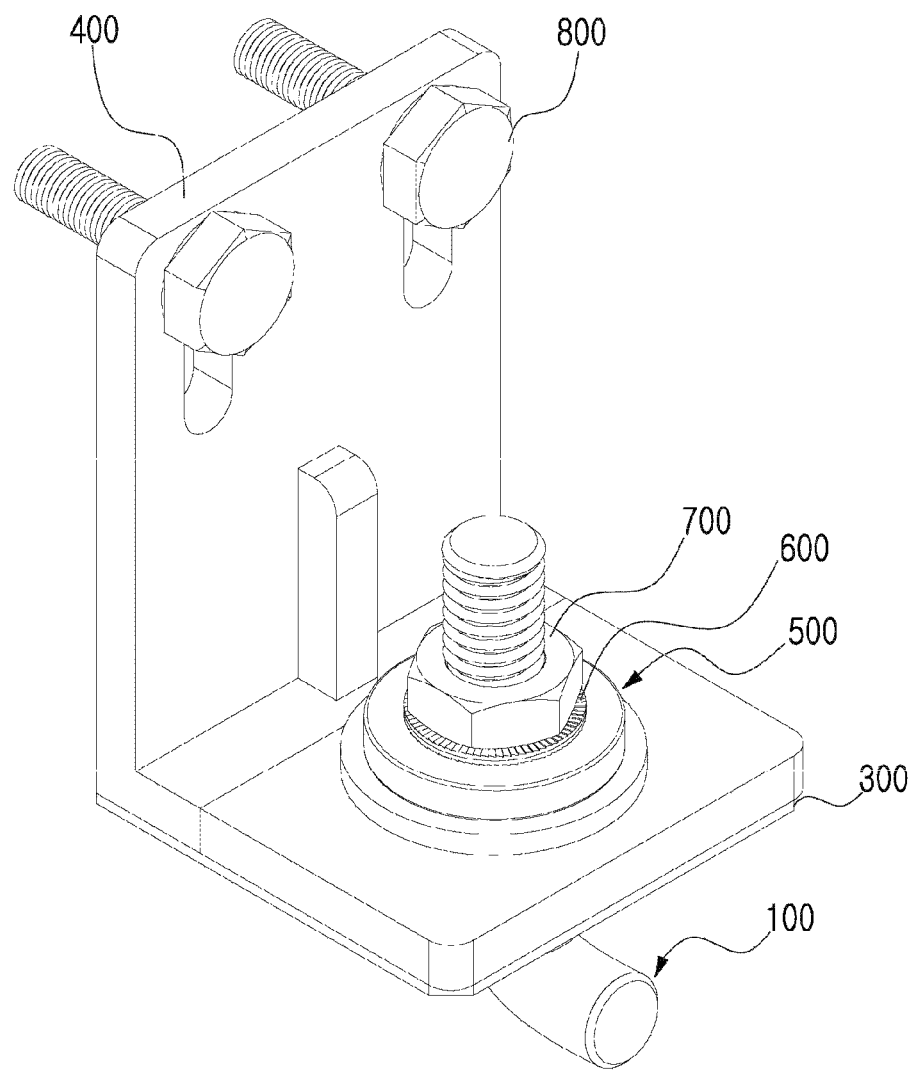
FIG. 1 is a view illustrating an L-shaped bolt fastening structure of the present invention.

The present invention can be modified into various forms and can have various example embodiments. The present invention is not intended to be limited to the specific example embodiments, and it should be interpreted that all the modifications, equivalents, and substitutions belonging to the concept and technical scope of the present invention are included in the present invention. In describing the present invention, when the detailed description of a relevant known function or configuration is determined to unnecessarily obscure an important point of the present invention, the detailed description will be omitted.

Hereinafter, example embodiments according to the present invention will be described in detail with reference to the accompanying drawings, and in describing the example embodiments with reference to the accompanying drawings, the same or corresponding components are assigned the same reference numerals, and redundant description thereof will be omitted.

FIG. 1 is a view illustrating an L-shaped bolt fastening structure of the present invention.

Figure 2:
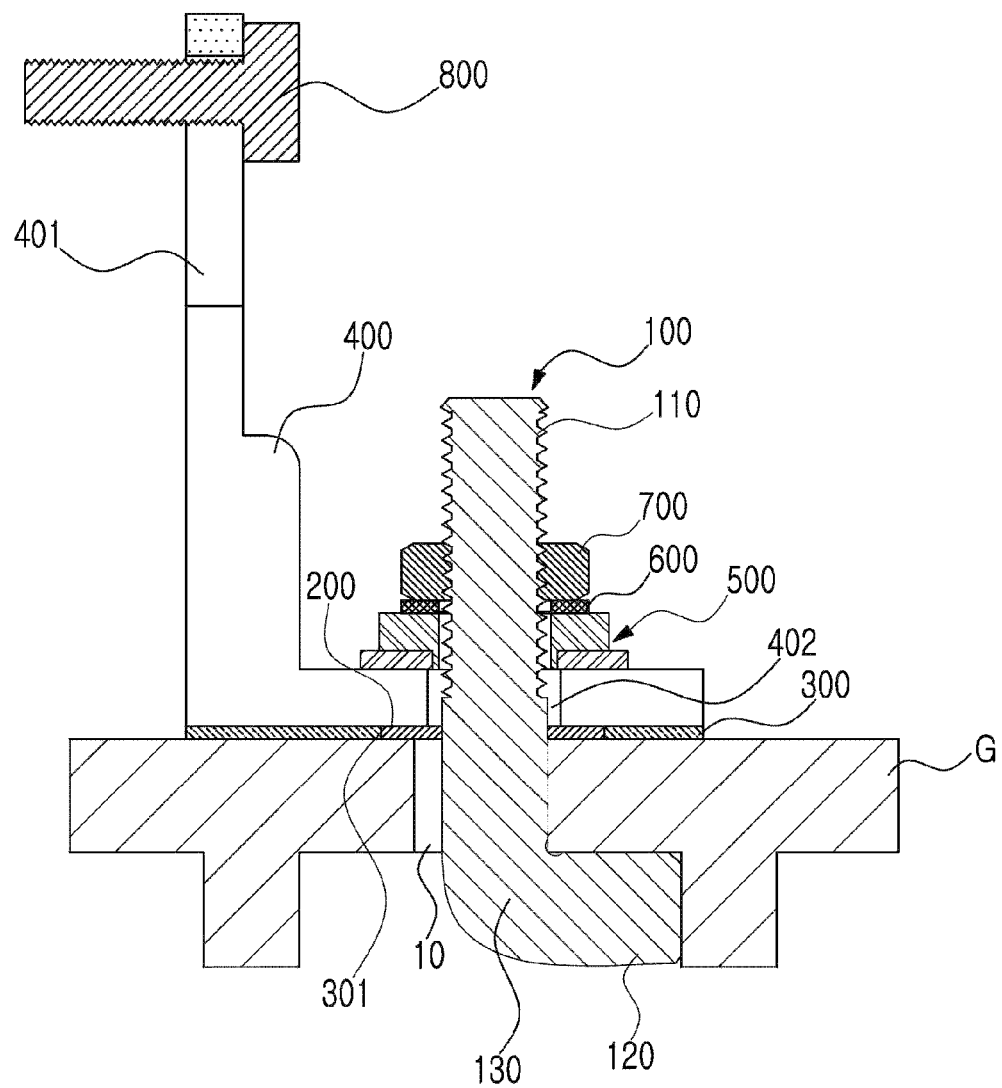
FIG. 2 is a cross-sectional view illustrating the L-shaped bolt fastening structure of the present invention.

FIG. 2 is a cross-sectional view illustrating the L-shaped bolt fastening structure of the present invention.

Referring to FIGS. 1 and 2, the L-shaped bolt fastening structure of the present invention is used as a fixing structure for fixing equipment used in industrial facilities onto a lower structure G such as such as a grating in which a plurality of holes are formed. Since the lower structure G is installed at a height of several meters, equipment placed on the lower structure G is also placed at a height of several meters from a ground surface. Under the lower structure G, pipes or wires for equipment are disposed. After being installed once in this way, a grating of the lower structure G supports the equipment, but since the lower structure G is installed at a height of several meters, lifting the lower structure or changing a position thereof is suppressed as much as possible to prevent accidents. This means that in the L-shaped bolt fastening structure of the present invention, in order to install an element disposed under the equipment, it is preferable that the element be fixed to the lower structure G by a worker above the lower structure G.

Therefore, the present invention provides the L-shaped bolt fastening structure in which a bolt fastening structure may be fixedly installed on the lower structure G in a state in which the lower structure G remains unchanged.

Accordingly, the L-shaped bolt fastening structure of the present invention includes an L-shaped bolt 100, a fall prevention washer 200, a buffer pad 300, a bracket 400, a coupling long hole washer 500, an anti-loosening washer 600, and a fixing nut 700.

In the L-shaped bolt fastening structure, by using the L-shaped bolt 100, the equipment disposed on the lower structure G is coupled and fixed to the lower structure G.

Figure 3:
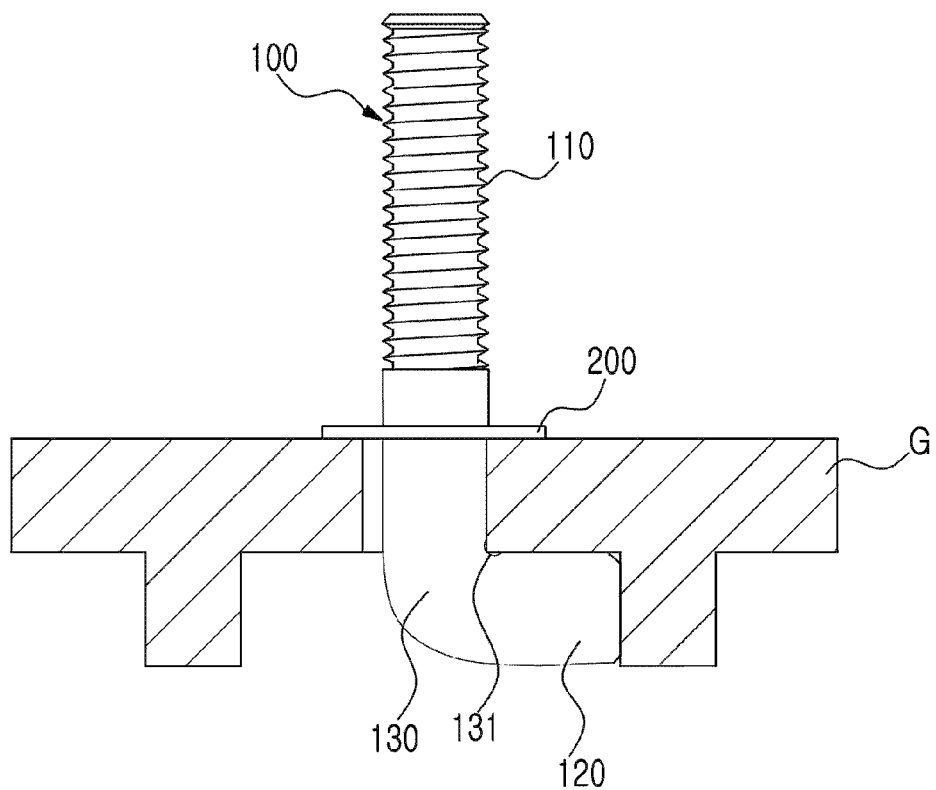
FIG. 3 is a view illustrating an L-shaped bolt according to an example embodiment of the present invention.

FIG. 3 is a view illustrating an L-shaped bolt according to an example embodiment of the present invention.

Referring to FIGS. 1 to 3, an L-shaped bolt 100 according to the present invention has an "L" shape and includes an upper vertical portion 110, a lower horizontal portion 120, and a bent portion 130. The lower horizontal portion 120 may have a shape extending downward from the upper vertical portion 110 through the bent portion 130.

The lower horizontal portion 120 may be a portion which, when coupled, is inserted into a hole 10 of the lower structure G and is positioned under the lower structure G and pressed against a lower surface of the lower structure G. The upper vertical portion 110 is a portion which passes through fastening holes formed in the lower structure G, the bracket 400 and fastening elements which are placed on the lower structure G. The upper vertical portion 110 has a screw groove formed thereon, and the fixing nut 700 is coupled thereto.

When the fixing nut 700 is tightened, the fixing nut 700 and the lower horizontal portion 120 of the L-shaped bolt 100 approach each other to press and couple coupling target objects therebetween, that is, elements of the L-shaped bolt fastening structure and the lower structure G.

In addition, a locking groove 131 having a groove shape with a certain angle may be formed on a bent inner portion of the bent portion 130. As an example, the locking groove 131 may be formed to have a groove shape toward the inside of the bent portion 130 and have a certain angle in an inward direction.

When the L-shaped bolt 100 is inserted into the hole 10 of the lower structure G and fastened with the fixing nut 700, due to the locking groove 131, the L-shaped bolt 100 may be fixed in an upright state. As an example, when the inside of the bent portion 130 has a curved shape, due to an inner curved portion thereof, the L-shaped bolt 100 cannot be in close contact with the hole 10 of the lower structure G. Therefore, when the L-shaped bolt 100 is fastened, the L-shaped bolt 100 may be fastened while inclined by the angle of the curved shape or may not be firmly fastened.

However, since the L-shaped bolt 100 according to the present invention includes the locking groove 131 having a certain angle on an inner portion of the bent portion 130, when the L-shaped bolt 100 is fastened to the lower structure G, the locking groove 131 may be fastened in close contact with a side surface of the hole 10 of the lower structure G.

Accordingly, the fixing nut 700 can be easily and quickly coupled, and also a correct coupling posture can be implemented even after the fixing nut 700 is completely tightened.

Figure 4:
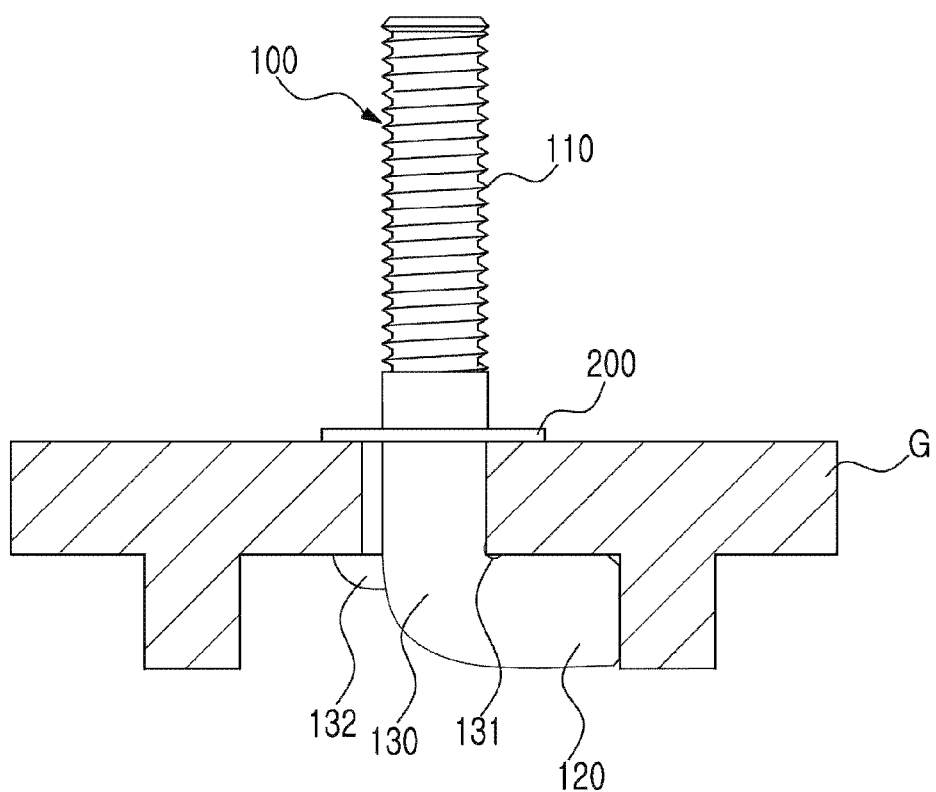
FIG. 4 is a view illustrating an L-shaped bolt according to another example embodiment of the present invention.

FIG. 4 is a view illustrating an L-shaped bolt according to another example embodiment of the present invention.

Referring to FIGS. 1, 2, and 4, in the L-shaped bolt according to another example embodiment of the present invention, a bent portion 130 of the L-shaped bolt 100 may include an upright auxiliary portion 132.

The upright auxiliary portion 132 may be formed on an outer curved surface of the L-shaped bolt 100. That is, the upright auxiliary portion 132 may have a shape protruding from a bent outer portion of the bent portion 130 of the L-shaped bolt 100. In this case, it is preferable that an upper surface of the upright auxiliary portion 132 be positioned to be coplanar with an upper surface of the lower horizontal portion 120. That is, the upper surface of the upright auxiliary portion 132 and the upper surface of the lower horizontal portion 120 are disposed in contact with a lower surface of the lower structure G, thereby allowing the L-shaped bolt 100 to be upright.

However, since a length of the lower horizontal portion of the L-shaped bolt 100 is increased due to lengths of the lower horizontal portion 200 and the upright auxiliary portion 132, the upright auxiliary portion 132 is applicable to a lower structure G having a long hole or a lower structure G having a large hole through which the upright auxiliary portion 132 can pass.

As described above, together with the locking groove 131, the upright auxiliary portion 132 may function to allow the L-shaped bolt 100 to be upright and fastened. That is, the locking groove 131 is in close contact with the hole 10 of the lower structure G, and the upright auxiliary portion 132 is in close contact with a lower surface of the lower structure G, thereby allowing the L-shaped bolt 100 to be fixed in an upright state. Therefore, since the fixing nut 700 may be fastened in a state in which the L-shaped bolt 100 is upright, the fixing nut 700 can be quickly coupled and can be fastened and fixed in an upright state.

Next, referring to FIGS. 1 and 2, the fall prevention washer 200 may be inserted into the L-shaped bolt 100 and mounted on the upper vertical portion 110. That is, the L-shaped bolt 100 may be fitted into the hole 10 of the lower structure G in a state in which the fall prevention washer 200 is mounted, and the fall prevention washer 200 may be disposed to be supported on an upper surface of the lower structure G, thereby preventing the L-shaped bolt 100 from falling below the lower structure G.

Figure 5:
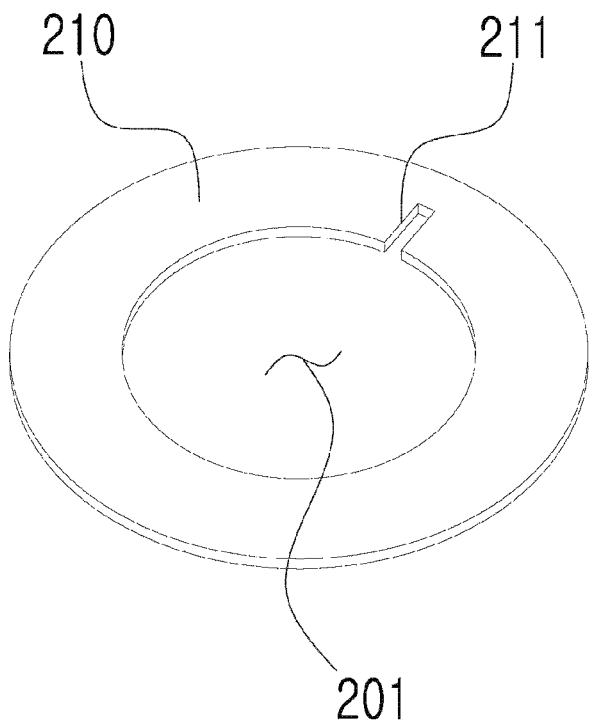
FIG. 5 is a view illustrating a fall prevention washer according to a first example embodiment of the present invention.

FIG. 5 is a view illustrating a fall prevention washer according to a first example embodiment of the present invention.

Referring to FIG. 5, a fall prevention washer 200 according to the first example embodiment of the present invention may include a locking portion 210 having a ring shape with a coupling hole 201 and a mounting groove 211 formed inside the locking portion 210. Here, the coupling hole 201 may be a hole into which the L-shaped bolt 100 is inserted, and the locking portion 210 may be a portion supported on an upper surface of the lower structure G. In addition, the mounting groove 211 may be a groove for fastening the fall prevention washer 200 to the L-shaped bolt 100 including an upright auxiliary portion 132.

For example, a diameter of the coupling hole 201 of the fall prevention washer 200 may be less than or equal to a diameter of the upper vertical portion 110 of the L-shaped bolt 100. This is to fix the fall prevention washer 200 to the L-shaped bolt 100 after the L-shaped bolt 100 is inserted into the fall prevention washer 200.

In this case, since, in the upper vertical portion 110 of the L-shaped bolt 100, a portion on which a thread is formed has a larger diameter than a portion on which a thread is not formed, in order to fasten the fall prevention washer 200 to the L-shaped bolt 100, the fall-prevention washer 200 should be inserted onto the lower horizontal portion 120 of the L-shaped bolt 100 and moved up to a position of the upper vertical portion 110.

As an example, in order to fasten the fall prevention washer 200 to the L-shaped bolt 100 including the upright auxiliary portion 132 shown in FIG. 4, the fall prevention washer 200 according to the first example embodiment may be used. That is, since the locking portion 210 of the fall prevention washer 200 includes the mounting groove 211, due to the mounting groove 211, the fall prevention washer 200 may pass through the upright auxiliary portion 132 to move to the upper vertical portion 110.

Figure 6:
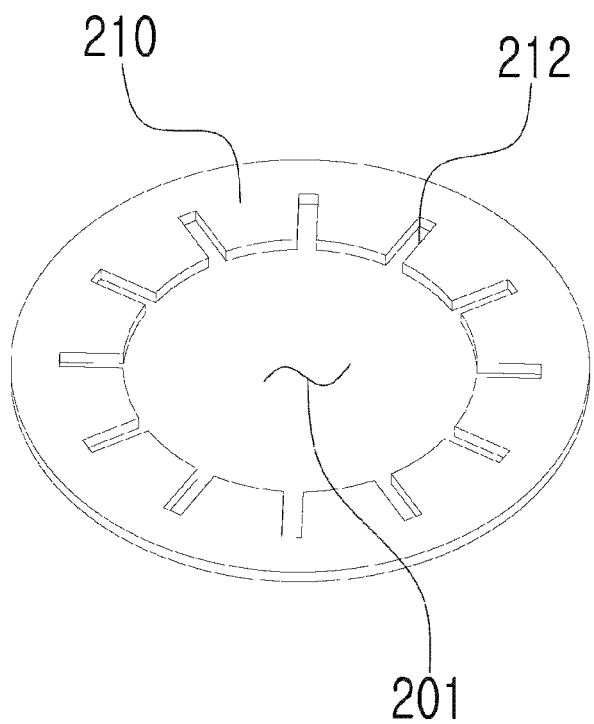
FIG. 6 is a view illustrating a fall prevention washer according to a second example embodiment of the present invention.

FIG. 6 is a view illustrating a fall prevention washer according to a second example embodiment of the present invention.

Referring to FIG. 6, a fall prevention washer 200 according to the second example embodiment of the present invention may include a locking portion 210 having a ring shape with a coupling hole 201 and a plurality of cut portions 212 inside the locking portion 210. In this case, a diameter of the coupling hole 201 of the fall prevention washer 200 may be less than a diameter of the L-shaped bolt 100. As an example, when the fall prevention washer 200 is moved in a direction from the lower horizontal portion 120 of the L-shaped bolt 100 toward the upper vertical portion 110 to fasten the fall prevention washer 200 to the L-shaped bolt 100, while the cut portions 212 are widened, the fall prevention washer 200 having a diameter that is less than the diameter of the L-shaped bolt 100 may be fastened to the L-shaped bolt 100. Therefore, when the fall prevention washer 200 is positioned on the upper vertical portion 110, the fall prevention washer 200 can be stably fixed to the L-shaped bolt 100 by the cut portion 212.

Figure 7:
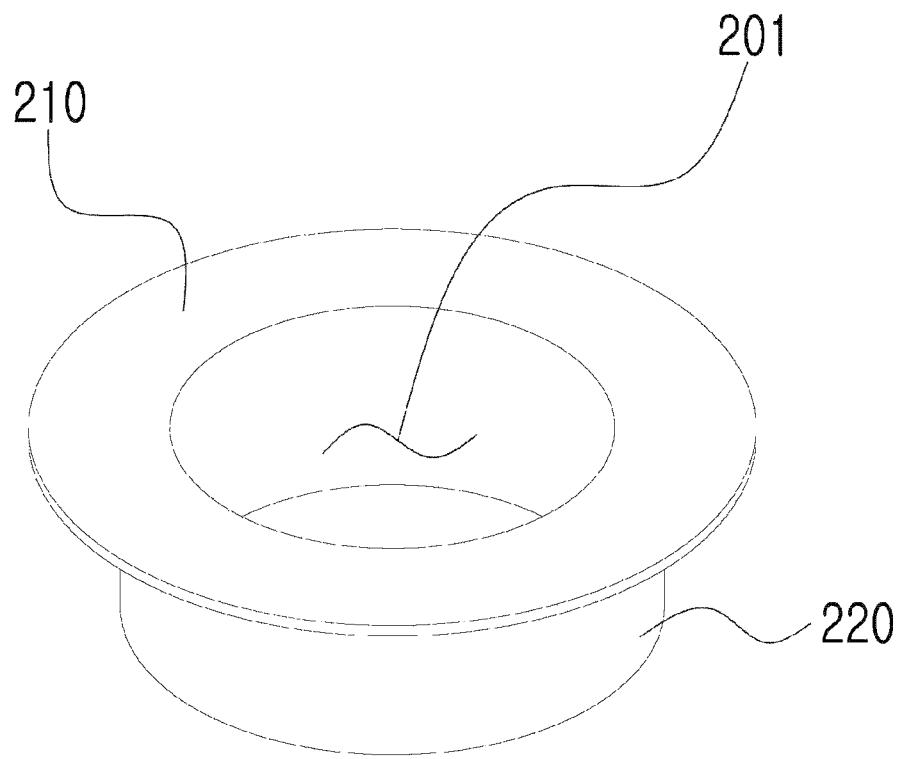
FIGS. 7 and 8 are views illustrating a fall prevention washer according to a third example embodiment of the present invention.
Figure 8:
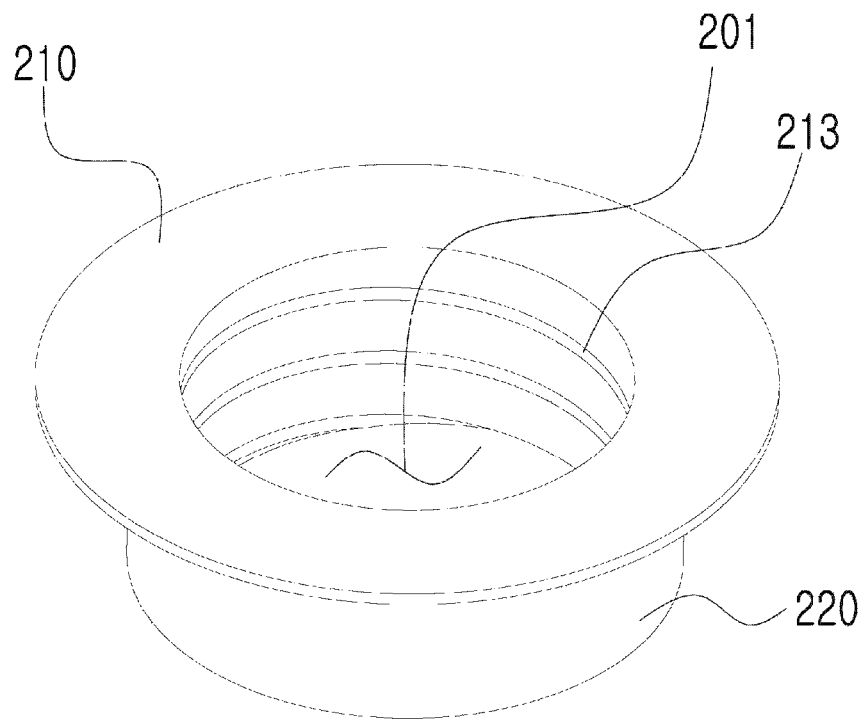

FIGS. 7 and 8 are views illustrating a fall prevention washer according to a third example embodiment of the present invention.

Referring to FIGS. 7 and 8, a fall prevention washer 200 according to the third example embodiment of the present invention may include a locking portion 210 having a ring shape with a coupling hole 201 and an insertion portion 220 formed below the locking portion 210. As an example, when the L-shaped bolt 100 to which the fall prevention washer 200 is fastened is mounted on the lower structure G, the insertion portion 220 of the fall prevention washer 200 may be inserted into the hole 10 of the lower structure G. More specifically, the locking portion 210 of the fall prevention washer 200 is supported on an upper surface of the lower structure G, and the insertion portion 220 is inserted into the hole of the lower structure G, thereby preventing the L-shaped bolt 100 from shaking due to a clearance in a bolt hole 101. That is, the L-shaped bolt 100 can be fixed upright in the hole of the lower structure G. Therefore, a worker can quickly and firmly perform a task when mounting or disassembling a bolt fastening structure to the lower structure G.

In addition, as shown in FIG. 8, a tap 213 to be fastened to a thread of the L-shaped bolt 100 may be formed on an inner surface of the fall prevention washer 200 in which the coupling hole 201 is formed. That is, the tap 213 may be formed to extend from the inside of the locking portion 210 to the inside of the insertion portion 220.

When the tap 213 is formed in the coupling hole 201, the fall prevention washer 200 may be inserted onto and fastened to the upper vertical portion 110 in which the thread of the L-shaped bolt 100 is formed. The fall prevention washer 200 fastened to the thread of the L-shaped bolt 100 using the tap 213 is preferably formed of a metal material. Therefore, the fall prevention washer 200 can be easily fastened to the L-shaped bolt 100, and the L-shaped bolt 100 can stay upright due to the insertion portion 220 inserted into the hole 10 of the lower structure G. In addition, the insertion portion 220 inserted into the hole 10 of the lower structure G may have a function as a barrier for surrounding and protecting the inside of the hole 10, thereby obtaining an effect of preventing the hole 10 from being damaged by movement of the L-shaped bolt 100.

Figure 9:
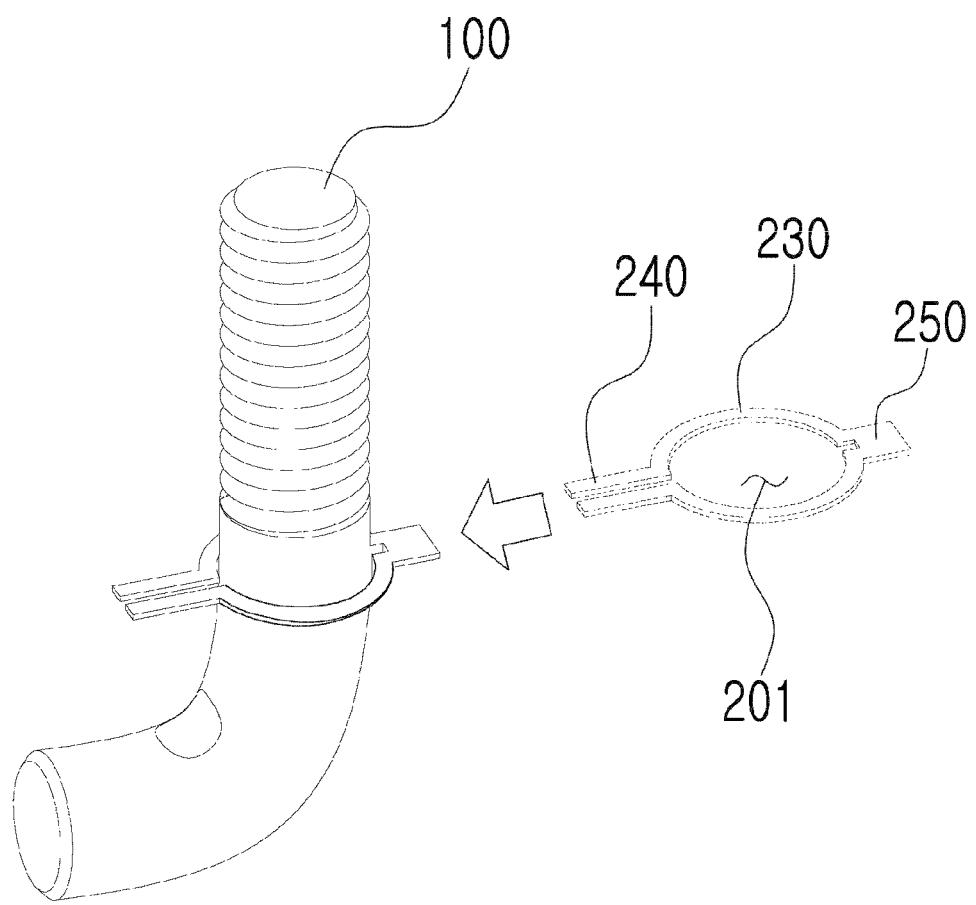
FIG. 9 is a view illustrating a fall prevention washer according to a fourth example embodiment of the present invention.

FIG. 9 is a view illustrating a fall prevention washer according to a fourth example embodiment of the present invention.

FIG. 10 shows views illustrating a use example of the fall prevention washer according to the fourth example embodiment of the present invention.

Referring to FIGS. 9 and 10, a fall prevention washer 200 according to the fourth example embodiment of the present invention may include a ring portion 230 having a ring shape with a coupling hole 201 and an expansion portion 240 and a protrusion 250 which are formed at both sides of the ring portion 230.

The expansion portion 240 and the protrusion 250 are formed to extend from the ring portion 230 and may be formed to protrude from both sides of the ring portion 230. In this case, the expansion portion 240 may have a form divided into two portions. As an example, a distance between the divided portions of the expansion portion 240 may be increased or decreased by a certain force. That is, the distance between the divided portions of the expansion portion 240 may be increased by an externally applied force and may be decreased again by elasticity when the force is removed. In addition, when the distance between the divided portions of the expansion portion 240 connected to the ring portion 230 is increased, the coupling hole 201 of the ring portion 230 may also expand, and the distance between the divided portions of the expansion portion 240 may be decreased so that the coupling hole 201 may also contract.

Therefore, when the fall prevention washer 200 according to the fourth example embodiment is fastened to the L-shaped bolt 100, as shown in FIG. 8, the fall prevention washer 200 may be fastened directly to the upper vertical portion 110 of the L-shaped bolt 100 using elasticity of the expansion portion 240.

Figure 10A:
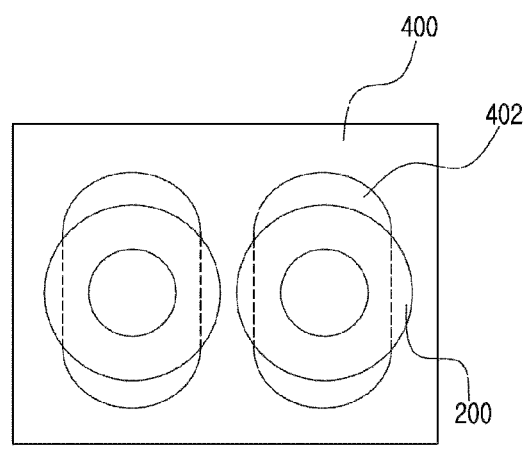
FIGS. 10A-10B show views illustrating a use example of the fall prevention washer according to the fourth example embodiment of the present invention.
Figure 10B:
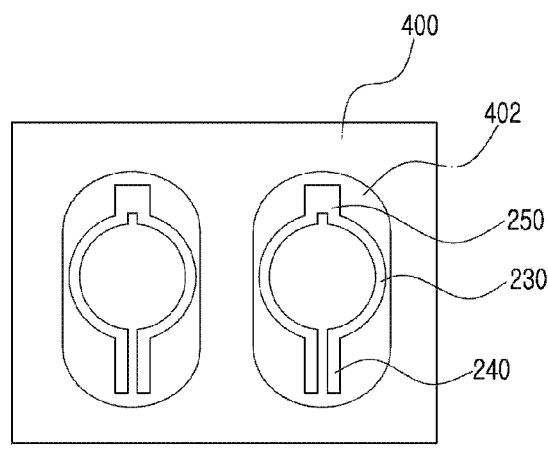

In addition, as shown in FIG. 10A, when a hole 402 formed in the bracket 400 has a long hole shape, a clearance may be generated between the bracket 400 and the lower structure G by interference between the bracket 400 and the fall prevention washer 200 having a ring shape. However, as shown in FIG. 10B, the fall prevention washer 200 according to the fourth example embodiment of the present invention may be disposed in a long hole without interference with the bracket 400 in which the long hole is formed. That is, the fall prevention washer 200 may be fixed to the L-shaped bolt 100 by the ring portion 230 and may be supported on an upper surface of the lower structure G by the expansion portion 240 and the protrusion 250. Therefore, the fall prevention washer 200 can be easily installed and dissembled and can also be used for the bracket 400 having the long hole.

Figure 11:
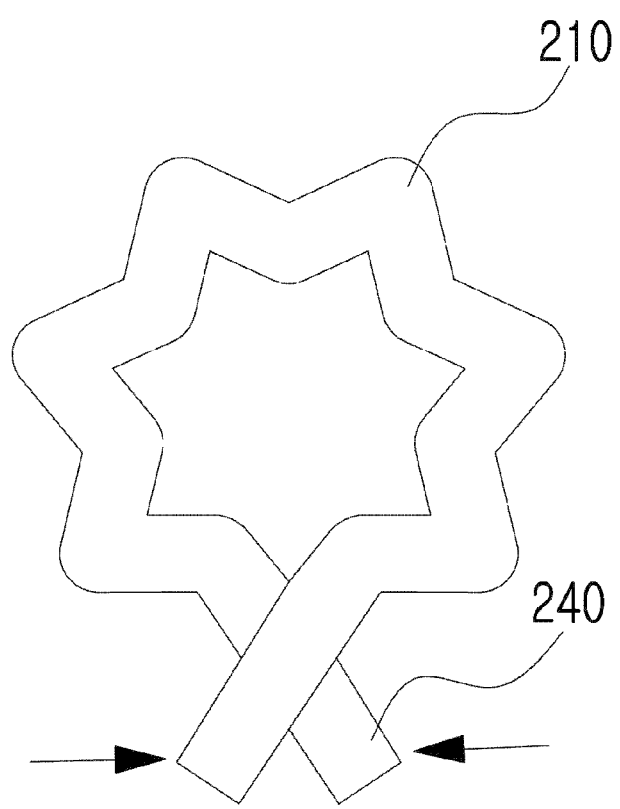
FIG. 11 is a view illustrating a fall prevention washer according to a fifth example embodiment of the present invention.

FIG. 11 is a view illustrating a fall prevention washer according to a fifth example embodiment of the present invention.

Referring to FIG. 11, a fall prevention washer 200 according to the fifth example embodiment of the present invention may include a locking portion 210 having a ring shape with a coupling hole 201 and an expansion portion 240 formed at one side of the locking portion 210.

In this case, the locking portion 210 may have a zigzag ring shape. Due to such a zigzag shape, a plurality of protrusions may be formed inside the locking portion 210. The protrusion may function to more firmly fix the fall prevention washer 200 to the L-shaped bolt 100.

In addition, the expansion portion 240 may be formed to extend from the locking portion 210 and to protrude to one side and may be formed to be divided into two portions. However, the expansion portion 240 according to the fifth example embodiment may be disposed such that the divided portions intersect each other. That is, when an external force is applied to the intersecting portions of the expansion portion 240, a size of the coupling hole 201 may also be enlarged or reduced through elasticity of the expansion portion 240. Therefore, the fall prevention washer 200 according to the fifth example embodiment may be fastened and fixed to the L-shaped bolt 100 in the form of a clip.

As an example, when the size of the coupling hole 201 is enlarged by applying an external force to the expansion portion 240, the L-shaped bolt 100 is inserted therein, and when the insertion of the L-shaped bolt 100 is completed, the external force applied to the expansion portion 240 is removed to reduce the size of the coupling hole 201, thereby fixing the fall prevention washer 200 to the L-shaped bolt 100. In this case, the fall prevention washer 200 may be more firmly fixed to the L-shaped bolt 100 due to the zigzag shape of the locking portion 210.

As described above, according to the L-shaped bolt fastening structure according to the present invention, when the L-shaped bolt 100 is mounted on or disassembled from the lower structure G using one of the fall prevention washers 200 according to the first to fifth example embodiments, it is possible to prevent the L-shaped bolt 100 from falling below the lower structure G.

Next, referring to FIGS. 1 and 2, as can be seen in the drawings, the bracket 400 may have an "L" shape, but the present invention is not limited thereto. Various other shapes in which one side portion may be coupled to the equipment and the other side portion may be coupled to the lower structure G may be applied.

One or more first long holes 401 to be coupled to the equipment are formed in one side of the bracket 400, and a second long hole 402 is formed in the other side. Through the first long hole 401 of the bracket 400, a coupling bolt 800 is fastened to a screw hole (not shown) of the equipment, and the L-shaped bolt 100 is inserted into the second long hole 402. Accordingly, the bracket 400 may be disposed on the fall prevention washer 200.

In this case, the buffer pad 300 having a washer hole 301 may be included between the bracket 400 and the lower structure G. The buffer pad 300 may be disposed on the lower structure G for the fall prevention washer 200 to be inserted into the washer hole 301. Therefore, the buffer pad 300 can prevent vibration introduced from the lower structure G from being transmitted upward, and the fall prevention washer 200 can prevent the bracket 400 from structurally floating.

The coupling long hole washer 500, the anti-loosening washer 600, and the fixing nut 700 may be disposed on the bracket 400.

The coupling long hole washer 500 may be disposed on the bracket 400. More specifically, the coupling long hole washer 500 is inserted into the L-shaped bolt 100 to function to allow the L-shaped bolt 100 to be fastened in an upright state when the fixing nut 700 is fastened to the L-shaped bolt 100.

Figure 12:
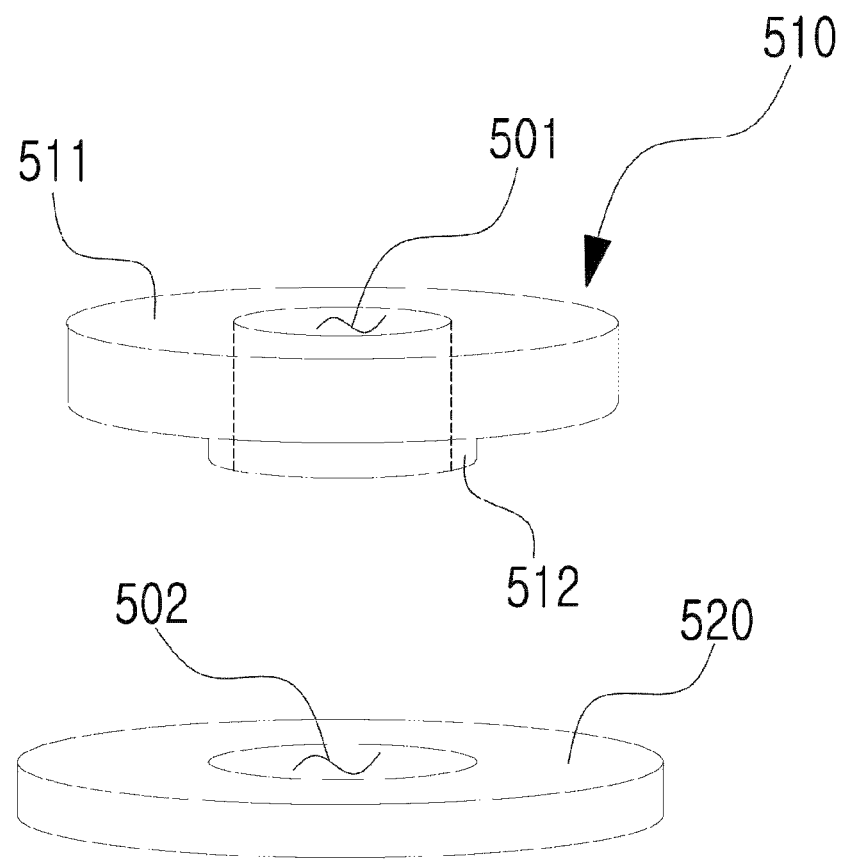
FIG. 12 is a view illustrating a coupling long hole washer of the present invention.

FIG. 12 is a view illustrating a coupling long hole washer of the present invention.

FIG. 13 is a cross-sectional view illustrating a coupled state of the coupling long hole washer of the present invention.

Referring to FIGS. 12 and 13, a coupling long hole washer 500 of the present invention may include a stacked washer 510 and a support washer 520. Here, the stacked washer 510 and the support washer 520 may have a ring shape with a hole formed in a central portion thereof.

The stacked washer 510 may be stacked on the support washer 520 and coupled thereto. In addition, the stacked washer 510 may include a support portion 511 and a hole insertion portion 512. A fastening hole 501 into which an L-shaped bolt 100 is inserted may be formed to pass through the support portion 511 and the hole insertion portion 512. Accordingly, an inner diameter of the fastening hole 501 may be equal to an outer diameter of the L-shaped bolt 100.

The support portion 511 may have a circular or quadrangular shape and may be a portion supported on an upper surface of the support washer 520 when the stacked washer 510 is stacked on the support washer 520.

The hole insertion portion 512 may be formed to protrude downward from the support portion 511 and may be a portion inserted into an insertion hole 502 of the support washer 520 when the stacked washer 510 is stacked on the support washer 520. That is, when the hole insertion portion 512 of the stacked washer 510 is inserted into the insertion hole 502 of the support washer 520, the stacked washer 510 may be stacked on the support washer 520.

The support washer 520 may have a ring shape in which the insertion hole 502 is formed in a central portion thereof. In this case, an inner diameter of the insertion hole 502 may be equal to an outer diameter of the hole insertion portion 512 for the hole insertion portion 512 of the stacked washer 510 to be inserted therein. In addition, a height of the insertion hole 502 may be equal to a height of the hole insertion portion 512. That is, when the hole insertion portion 512 of the stacked washer 510 is inserted into the insertion hole 502 of the support washer 520, a lower surface of the hole insertion portion 512 is disposed to be coplanar with a lower surface of the support washer 520.

As described above, the coupling long hole washer 500 may be disposed on a bracket 400 in a state in which the stacked washer 510 and the support washer 520 are coupled to each other. When the L-shaped bolt 100 is fixed using a fixing nut 700, the coupling long hole washer 500, which is separated into the stacked washer 510 and the support washer 520 and coupled, may allow the L-shaped bolt 100 to be fastened in an upright state.

FIG. 14 shows views illustrating a comparison between a coupling state of a coupling long hole washer of the present invention and a coupling state of a conventional washer.

Figure 14A:
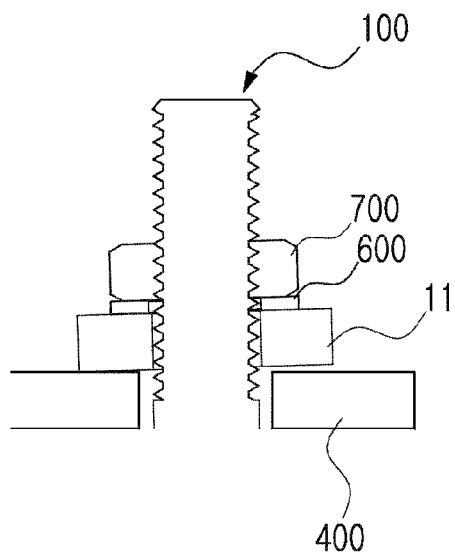
FIGS. 14A-14B show views illustrating a comparison between a coupling state of a coupling long hole washer of the present invention and a coupling state of a conventional washer.
Figure 14B:
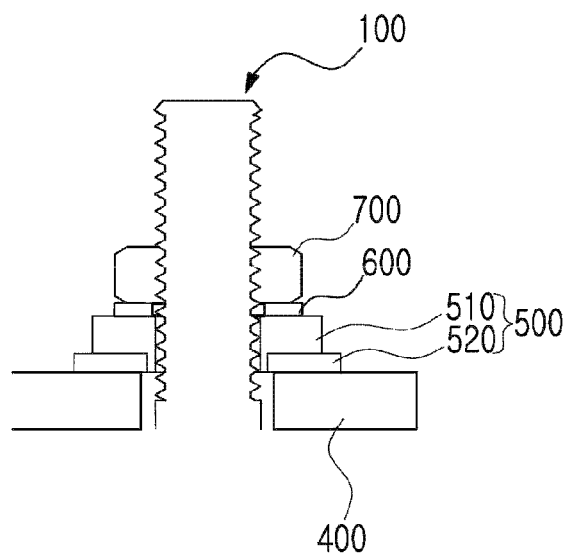

First, FIG. 14A is a view illustrating a coupling state when an L-shaped bolt 100 is fastened using a conventional washer 11, and FIG. 14B is a view illustrating a coupling state when the L-shaped bolt 100 is fastened using a coupling long hole washer 500 of the present invention.

As shown in FIG. 14A, in a case in which a washer 11 having a certain height is disposed between a bracket 400 and a fixing nut 700 in order for the L-shaped bolt 100 to be upright, when the fixing nut 700 is tightened, even when the L-shaped bolt 100 is upright, the washer 11 may be fastened in an inclined state. That is, the washer 11 and the fixing nut 700 may be fastened to the L-shaped bolt 100 in a state in which a lower surface of the washer 11 is partially floating. Such abnormal coupling may cause defects such as damage to a thread of the L-shaped bolt 100 or bending of the washer 11.

However, according to the present invention, as shown in FIG. 14B, since a coupling long hole washer 500 is separated into a stacked washer 510 and a support washer 520, when the L-shaped bolt 100 is fastened using the fixing nut 700, the separated stacked washer 510 and support washer 520 may be moved to make the L-shaped bolt 100 stand upright and concurrently fasten the L-shaped bolt 100 such that the coupling long hole washer 500 is in close contact with the bracket 400. In addition, since the stacked washer 510 is stacked on the support washer 520 in a state in which a hole insertion portion 512 is inserted into an insertion hole 502 of the support washer 520, when the fixing nut 700 is fastened, a movement range of the stacked washer 510 and the support washer 520 is restricted, thereby further improving the uprightness of the L-shaped bolt 100.

Next, referring to FIGS. 1 and 2, an anti-loosening washer 600 is disposed on the coupling long hole washer 500, and the fixing nut 700 is fastened onto the anti-loosening washer 600. A protrusion may be formed on a surface of the anti-loosening washer 600 to prevent the fixing nut 700 from being loosened by vibration or external shock after the fixing nut 700 is fixed.

FIGS. 15 to 19 are views illustrating a method of mounting an L-shaped bolt fastening structure using a coupling long hole washer according to the present invention.

Figure 15:
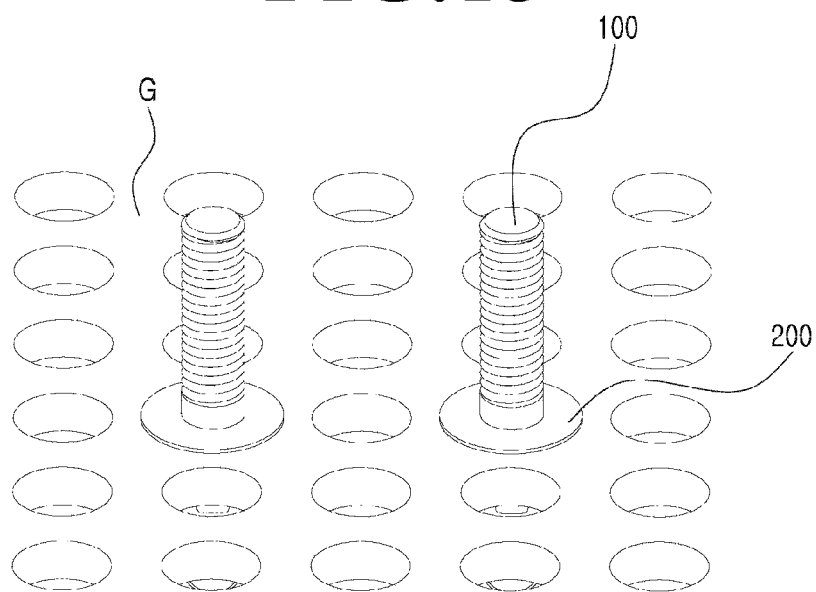
FIGS. 15 to 19 are views illustrating a method of mounting an L-shaped bolt fastening structure using a coupling long hole washer according to the present invention.

First, referring to FIGS. 15, an L-shaped bolt 100 on which a fall prevention washer 200 is mounted is fastened to a lower structure G. The L-shaped bolt 100 may be fastened by inserting a lower horizontal portion 120 into a hole 10 of the lower structure G from above the lower structure G. In this case, the L-shaped bolt 100 is fixed by the fall prevention washer 200, thereby preventing the L-shaped bolt 100 from falling below the lower structure G.

Figure 16:
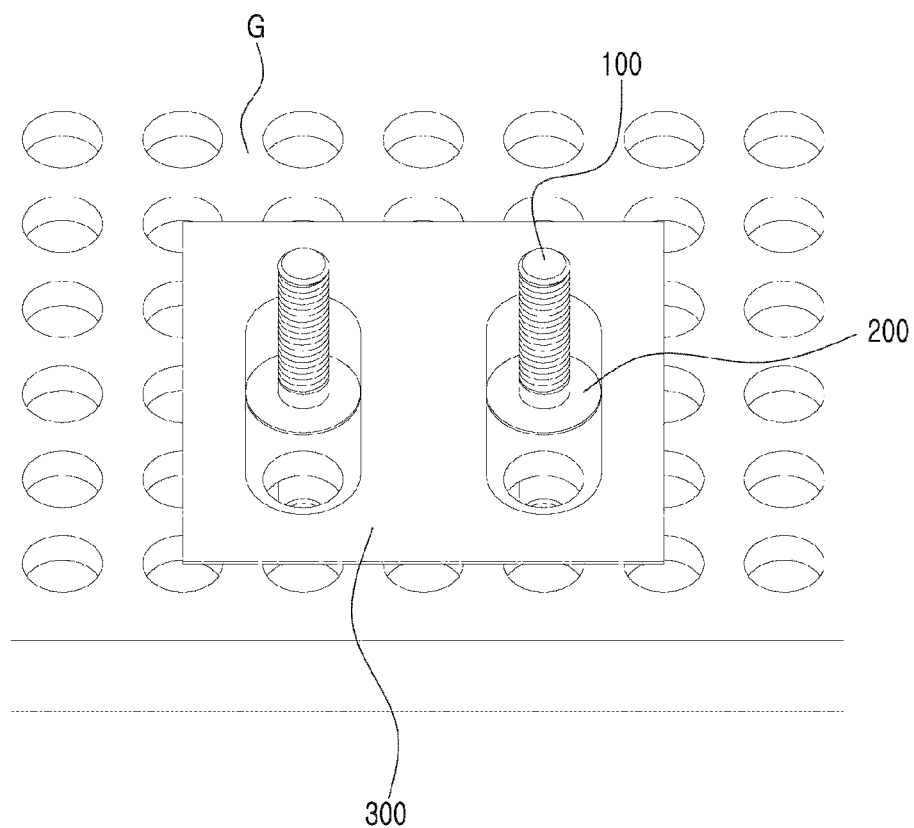

Referring to FIG. 16, a buffer pad 300 is mounted on the lower structure G. The buffer pad 300 may have the same shape as a lower surface of a bracket 400, and the L-shaped bolt 100 and the fall prevention washer 200 may be exposed to the outside by a washer hole 301. The buffer pad 300 may be formed of, for example, an elastic rubber material.

Figure 17:
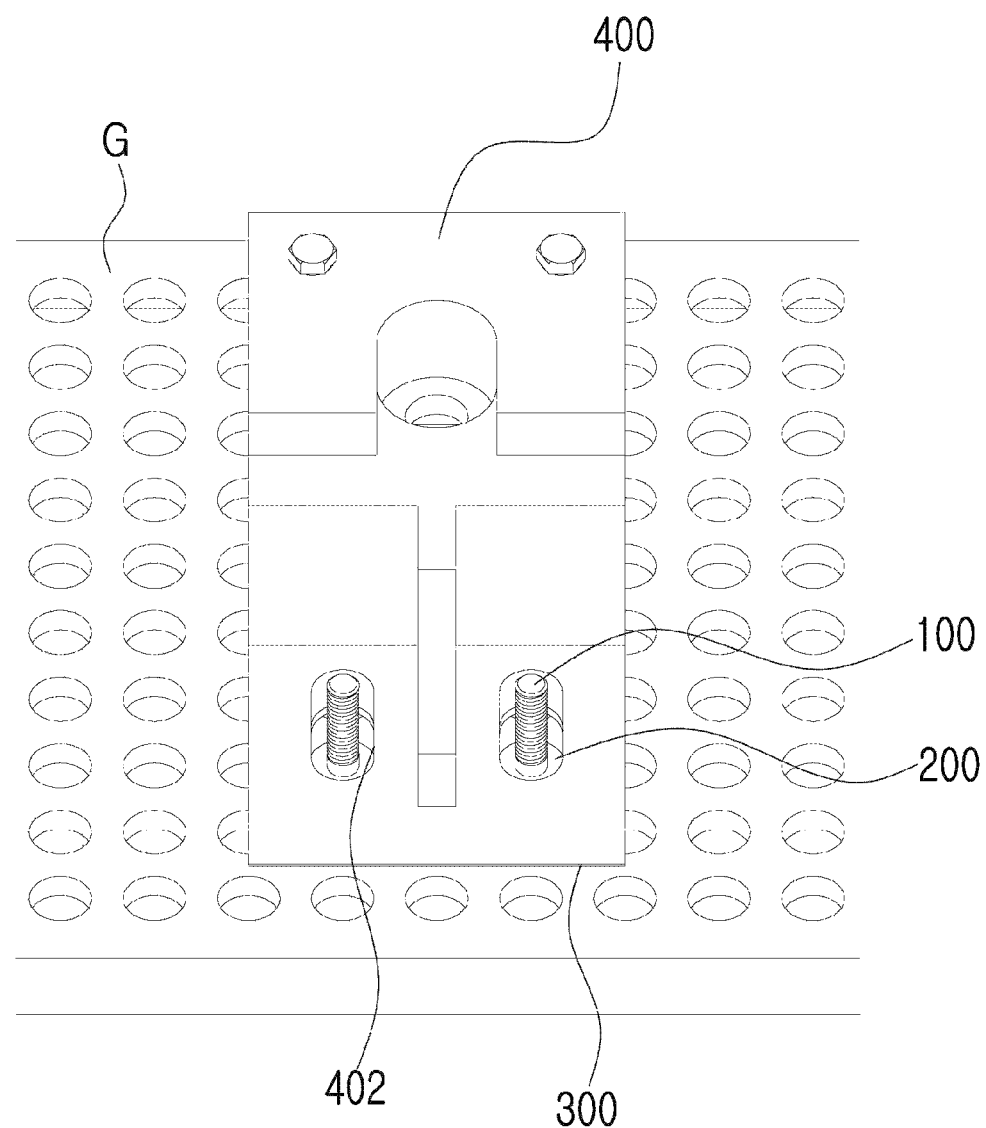

Referring to FIG. 17, the bracket 400 is disposed on the buffer pad 300. The L-shaped bolt 100 may be disposed in a second long hole 402 of the bracket 400. In this case, a clearance may be generated between the L-shaped bolt 100 and the second long hole 402.

Figure 18:
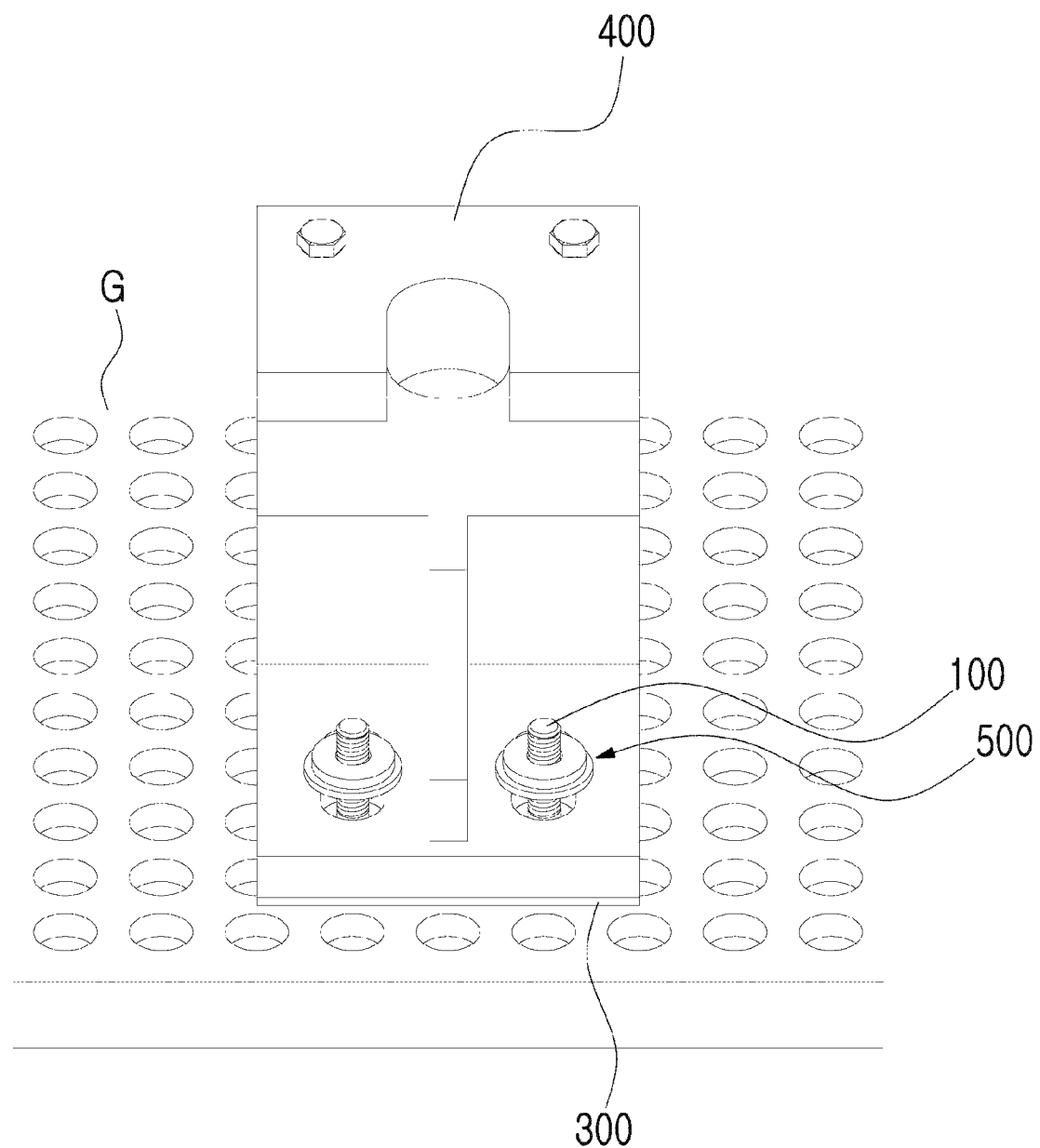

Referring to FIG. 18, a coupling long hole washer 500 is disposed on the bracket 400. The coupling long hole washer 500 may be fastened to the L-shaped bolt 100 and disposed on the bracket 400. In this case, in a state in which a stacked washer 510 and a support washer 520 are coupled, the coupling long hole washer 500 may be fastened to the L-shaped bolt 100. Alternatively, the support washer 520 may be first fastened to the L-shaped bolt 100, and the coupling long hole washer 500 may be fastened to the L-shaped bolt 100 such that the stacked washer 510 is stacked on the support washer 520.

Figure 19:
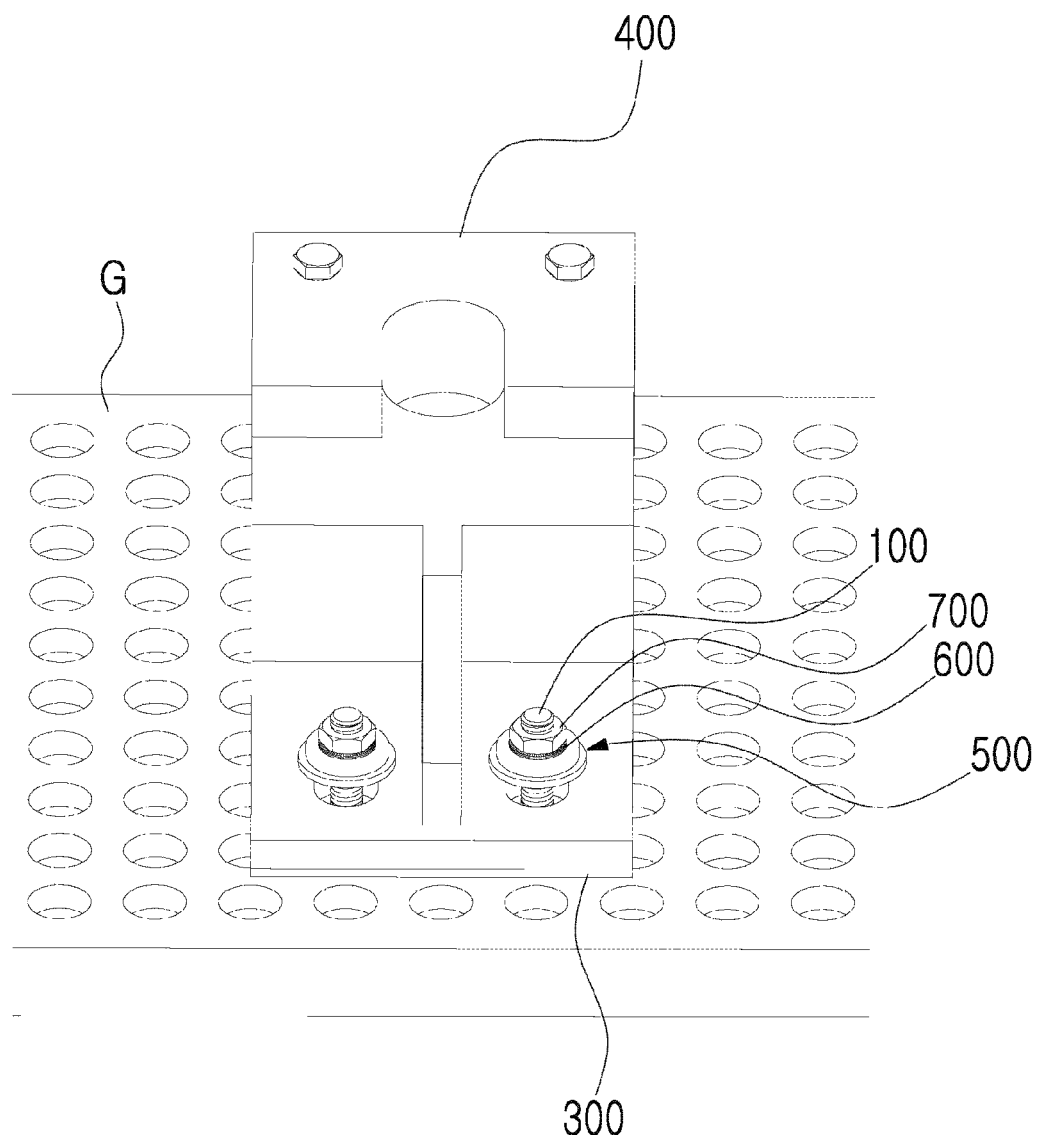

Referring to FIG. 19, an anti-loosening washer 600 and a fixing nut 700 may be sequentially fastened on the coupling long hole washer 500. In this case, while being held upright by the coupling long hole washer 500, the L-shaped bolt 100 may be fastened by the fixing nut 700.

As described above, in the L-shaped bolt fastening structure according to the present invention, since a bent portion 130 of the L-shaped bolt 100 includes a locking groove 131 and an upright auxiliary portion 132, in a state in which the L-shaped bolt 100 is upright, the fixing nut 700 can be fastened. Accordingly, the fixing nut 700 can be easily and quickly coupled, and also a correct coupling posture can be implemented even after the fixing nut 700 is completely tightened. In addition, since the coupling long hole washer 500 that is divided and coupled is added between the bracket 400 and the fixing nut 700, when the fixing nut 700 is fastened to the L-shaped bolt 100, the fixing nut 700 can be fastened in a state in which the L-shaped bolt 100 is upright. Furthermore, by using the fall-prevention washer 200, the L-shaped bolt 100 can be prevented from falling below the lower structure. By using one of fall-prevention washers 200 according to various example embodiments, the fixing nut 700 can be easily mounted on and more firmly fixed to the L-shaped bolt 100.

According to the present invention, since a bent portion of an L-shaped bolt includes a locking groove and an upright auxiliary portion, in a state in which the L-shaped bolt is upright, a fixing nut can be fastened. Accordingly, the fixing nut can be easily and quickly coupled, and also a correct coupling posture can be implemented even after the fixing nut is completely tightened.

In addition, since a coupling long hole washer that is divided and coupled is added between a bracket and a fixing nut, when the fixing nut is fastened to the L-shaped bolt, the fixing nut can be fastened in a state in which the L-shaped bolt is upright.

Furthermore, by using a fall-prevention washer, an L-shaped bolt can be prevented from falling below a lower structure. By using one of fall-prevention washers according to various example embodiments, a fixing nut can be easily mounted on and more firmly fixed to an L-shaped bolt.

Effects of the present invention are not limited to the above-described effects and other effects which are not described may be clearly understood by those skilled in the art from the following descriptions.

Meanwhile, example embodiments of the present invention shown in the present specification and drawings are for enhancing understanding and are not intended to limit the scope of the present invention. It is clear to a person with ordinary knowledge in the art to which the present invention belongs that other modified example embodiments based on the technical concepts of the present invention are possible in addition to the disclosed example embodiments.

What is claimed is:

1. An L-shaped bolt coupling structure comprising:
   a lower structure which is positioned below equipment of an industrial facility and in which a hole for fastening is formed;
   an L-shaped bolt inserted into the hole of the lower structure and including an upper vertical portion on which a thread is formed and a lower horizontal portion which is formed to extend from a lower end of the upper vertical portion through a bent portion;
   a fall-prevention washer which has a ring shape, is fastened to the L-shaped bolt, and is supported on an upper surface of the lower structure to prevent the L-shaped bolt from falling below the lower structure;
   a bracket disposed on the lower structure and having a long hole into which the L-shaped bolt is inserted;
   an anti-loosening washer and a fixing nut disposed on the bracket and sequentially fastened to the L-shaped bolt; and
   a coupling long hole washer fastened to the L-shaped bolt and disposed between the bracket and the anti-loosening washer.

2. The L-shaped bolt coupling structure of claim 1, wherein the coupling long hole washer includes:
   a stacked washer having a fastening hole into which the L-shaped bolt is inserted; and
   a support washer having a ring shape and an insertion hole in a central portion thereof for the stacked washer to be inserted and stacked.

3. The L-shaped bolt coupling structure of claim 2, wherein the stacked washer includes:
   a support portion supported on an upper surface of the support washer and having a certain thickness; and
   a hole insertion portion formed below the support portion and inserted into the insertion hole of the support washer.

4. The L-shaped bolt coupling structure of claim 3, wherein a lower surface of the hole insert portion is coplanar with a lower surface of the support washer.

5. The L-shaped bolt coupling structure of claim 3, wherein:
   an inner diameter of the fastening hole of the stacked washer is equal to an outer diameter of the L-shaped bolt; and
   an inner diameter of the insertion hole of the support washer is equal to an outer diameter of the hole insertion portion.

6. The L-shaped bolt coupling structure of claim 1, wherein the L-shaped bolt includes a locking groove having a groove shape and a certain angle on a bent inner portion of the bent portion.

7. The L-shaped bolt coupling structure of claim 1, wherein the fall prevention washer includes:
   a locking portion which has a ring shape and is supported on the upper surface of the lower structure; and
   a coupling hole which is formed inside the locking portion and into which the L-shaped bolt is inserted.

8. The L-shaped bolt coupling structure of claim 7, wherein the L-shaped bolt includes an upright auxiliary portion having a shape that protrudes from a bent outer portion of the bent portion.

9. The L-shaped bolt coupling structure of claim 8, wherein the fall prevention washer further includes a mounting groove formed on the locking portion such that the locking portion passes through the upright auxiliary portion to be mounted on the upper vertical portion of the L-shaped bolt.

10. The L-shaped bolt coupling structure of claim 7, wherein the locking portion further includes a plurality of cut portions formed inside the locking portion.

11. The L-shaped bolt coupling structure of claim 7, wherein the fall prevention washer further includes an insertion portion formed below the locking portion and inserted into the hole of the lower structure.

12. The L-shaped bolt coupling structure of claim 7, wherein:
   the locking portion is formed in a zigzag shape; and
   the fall prevention washer further includes an extension portion which is formed to extend from the locking portion and allows a size of the coupling hole to be enlarged or reduced through elasticity thereof.

13. The L-shaped bolt coupling structure of claim 1, wherein the fall prevention washer includes:
- a ring portion having a ring shape and a coupling hole into which the L-shaped bolt is inserted;
- a protrusion protruding from one side of the ring portion; and
- an extension portion which formed by being divided from the other side of the ring portion, is widened by an external force, and is narrowed by elasticity thereof.

* * * * *